US012383910B2

(12) United States Patent
Lutoslawski et al.

(10) Patent No.: US 12,383,910 B2
(45) Date of Patent: Aug. 12, 2025

(54) PULVERIZER SYSTEM

(71) Applicant: TORXX KINETIC PULVERIZER LIMITED, Hamilton (BM)

(72) Inventors: Jaroslaw Lutoslawski, Bradford (CA); Mark Christopher Lugowski, Scarborough (CA)

(73) Assignee: TORXX KINETIC PULVERIZER LIMITED, Hamilton (BM)

( * ) Notice: Subject to any disclaimer, the term of this patent is extended or adjusted under 35 U.S.C. 154(b) by 0 days.

(21) Appl. No.: 17/883,046

(22) Filed: Aug. 8, 2022

(65) Prior Publication Data

US 2022/0379315 A1 Dec. 1, 2022

Related U.S. Application Data

(62) Division of application No. 15/405,626, filed on Jan. 13, 2017, now Pat. No. 11,440,021.

(Continued)

(51) Int. Cl.
*B02C 25/00* (2006.01)
*B02C 13/18* (2006.01)

(Continued)

(52) U.S. Cl.
CPC .............. *B02C 25/00* (2013.01); *B02C 13/18* (2013.01); *B02C 13/288* (2013.01); *B02C 13/30* (2013.01);

(Continued)

(58) Field of Classification Search
CPC ..... B02C 13/18; B02C 13/286; B02C 13/288; B02C 13/30; B02C 23/08; B02C 25/00; B02C 2013/28636

(Continued)

(56) References Cited

U.S. PATENT DOCUMENTS

375 A 9/1837 Smith
7,000 A 1/1850 Goshon (Continued)

FOREIGN PATENT DOCUMENTS

CN 103934085 A 7/2014
CN 104941749 A * 9/2015

(Continued)

OTHER PUBLICATIONS

Translation JP2005270893A (Year: 2024).*
CN 104941749 A , Translation (Year: 2024).*

*Primary Examiner* — Nhat Chieu Q Do
(74) *Attorney, Agent, or Firm* — Brooks Kushman P.C.

(57) ABSTRACT

A pulverizer may have such features as a drum having a top and bottom, a rotating shaft extending vertically in the drum having radially extending arms that create flow currents within the pulverizer to size reduce a material, and a dust collection system coupled to the outlet for extracting air and dust from the size reduced material. The pulverizer may have an ability to detect wrapping as well as possibly deter wrapping. A processor may also adjust the speed of rotation of the arms within the pulverizer and/or the speed of feed of input for various considerations. In fact the rotation direction may be reversed for at least brief periods of time in an effort to remove wrapped material. Vibration may also be sensed and efforts to prevent damage may be instigated by a processor.

20 Claims, 4 Drawing Sheets

Related U.S. Application Data

(60) Provisional application No. 62/279,309, filed on Jan. 15, 2016.

(51) Int. Cl.
*B02C 13/288* (2006.01)
*B02C 13/30* (2006.01)
*B02C 23/08* (2006.01)
*B02C 13/286* (2006.01)

(52) U.S. Cl.
CPC .... *B02C 23/08* (2013.01); *B02C 2013/28636* (2013.01)

(58) Field of Classification Search
USPC ............................................... 241/30, 34, 55
See application file for complete search history.

(56) References Cited

U.S. PATENT DOCUMENTS 56,672 A 7/1866 Heneage
125,172 A 4/1872 Chichester
134,513 A 1/1873 Chichester
248,923 A 11/1881 Dechamp
277,138 A 5/1883 Knight
441,372 A 11/1890 Morse
499,795 A 6/1893 Morse
964,102 A 7/1910 Gordon
1,048,869 A 12/1912 Pitcairn
1,178,386 A 4/1916 Edwards
1,197,888 A 9/1916 Adams
1,212,418 A 1/1917 Sturtevant
1,212,419 A 1/1917 Sturtevant
1,300,192 A 4/1919 Overstrom
1,608,717 A 11/1926 Bell
1,636,033 A 7/1927 Agnew
1,656,756 A 1/1928 Payne
1,669,239 A 5/1928 Grindle
1,758,010 A 5/1930 Pettinos
1,798,465 A 3/1931 Grindle
1,911,193 A 5/1933 Hill
1,935,344 A 11/1933 Andrews et al.
2,012,694 A 8/1935 Runyan
2,092,307 A 9/1937 Gaffney
2,093,703 A 9/1937 Blodgett
2,125,797 A 8/1938 Marino
2,130,064 A 9/1938 Bucky
2,147,666 A 2/1939 Park
2,164,409 A 7/1939 Johnson
2,171,525 A 9/1939 Ainsa
2,248,927 A 7/1941 Ainsa
2,259,939 A 10/1941 Garcia
2,275,595 A 3/1942 Schwartz
2,333,247 A * 11/1943 Harris .................... B02C 13/14 241/49
2,355,784 A 8/1944 Dondlinger
2,367,906 A 1/1945 Wall et al.
2,392,958 A 1/1946 Tice
2,546,286 A 3/1951 Zakel
2,562,560 A 7/1951 MacArtney
2,592,994 A 4/1952 Ahlmann
2,595,117 A 4/1952 Ahlmann
2,639,747 A 5/1953 Burn et al.
2,700,512 A 1/1955 Denovan et al.
2,707,594 A 5/1955 Moore
2,709,552 A 5/1955 Lecher
2,713,977 A 7/1955 Noll
2,750,120 A 6/1956 Pallmann
2,847,168 A 8/1958 Smiley
2,917,248 A 12/1959 Krug et al.
2,919,864 A 1/1960 Parmele
2,937,815 A 5/1960 Eirich et al.
2,940,676 A 6/1960 Brake
2,981,489 A 4/1961 Hannum, Jr.
2,992,783 A 7/1961 Wirth et al.
3,015,392 A 1/1962 Rozsa et al.
3,062,459 A 11/1962 Dearing
3,065,919 A 11/1962 Burkett et al.
3,071,330 A 1/1963 Jackering
3,123,115 A 3/1964 Howard
3,155,326 A 11/1964 Rhodes
3,160,354 A 12/1964 Burkett
3,180,582 A 4/1965 Danyluke
3,207,447 A 9/1965 Whitham
3,210,016 A 10/1965 Sevin et al.
3,302,895 A 2/1967 Ryder
3,326,476 A 6/1967 De Los Santos Izquierdo
3,329,350 A 7/1967 Wisgerhof et al.
3,346,203 A 10/1967 Danyluke
3,426,673 A 2/1969 Miner et al.
3,474,974 A 10/1969 Wood
3,490,704 A 1/1970 Bourne et al.
3,555,996 A 1/1971 Schwarz et al.
3,615,008 A 10/1971 Alpha
3,834,631 A 9/1974 King
3,873,034 A 3/1975 Iwahori et al.
3,887,141 A 6/1975 Francis
3,946,953 A 3/1976 Hato
3,976,002 A 8/1976 Gerlach
3,987,970 A 10/1976 Burkett
4,030,670 A 6/1977 Abernathy
4,098,466 A 7/1978 MacElvain et al.
4,144,167 A 3/1979 Burkett et al.
4,151,794 A 5/1979 Burkett
4,151,959 A 5/1979 Deister
4,177,950 A * 12/1979 Smith ....................... F23N 1/02 241/34
4,202,078 A 5/1980 Malinak
4,493,459 A 1/1985 Burkett
4,529,134 A 7/1985 Williams
4,531,461 A 7/1985 Sayler et al.
4,593,861 A 6/1986 Blakley et al.
4,602,744 A * 7/1986 Williams ................ F23N 1/002 241/30
4,637,561 A 1/1987 Edberg
4,690,338 A 9/1987 Sayler et al.
4,886,216 A 12/1989 Goble
4,988,045 A 1/1991 Griesesieck, III et al.
4,989,796 A 2/1991 Eide
5,067,661 A * 11/1991 Eide ........................ B02C 18/16 241/DIG. 38
5,184,781 A 2/1993 Andela
5,192,029 A 3/1993 Harris
5,205,500 A 4/1993 Eide
5,285,973 A 2/1994 Goforth et al.
5,379,951 A 1/1995 Hughes
5,680,994 A 10/1997 Eide et al.
5,685,500 A 11/1997 Eide et al.
5,839,671 A 11/1998 Sand et al.
5,845,855 A * 12/1998 Yamada .................. B02C 13/10 241/260
5,881,959 A 3/1999 Hadjinian
6,024,307 A 2/2000 Sand et al.
6,135,370 A 10/2000 Arnold
6,179,231 B1 1/2001 Csendes
6,227,473 B1 5/2001 Arnold
6,325,306 B1 * 12/2001 Gacanich ................ B02C 18/10 241/15
6,467,707 B1 * 10/2002 Williams, Jr. ............ F23K 1/00 241/34
6,726,133 B2 4/2004 Hahn et al.
7,222,805 B1 5/2007 Williams, Jr.
7,950,601 B2 5/2011 Watts
8,020,791 B2 9/2011 Knueven et al.
8,267,337 B2 9/2012 Webb
8,678,306 B2 3/2014 Watts
8,931,721 B2 1/2015 Jensen
9,205,431 B2 12/2015 Anderson, Jr.
9,498,780 B2 11/2016 Watts et al.
9,707,564 B2 7/2017 Mogan et al.
9,751,087 B2 9/2017 Watts et al.
2002/0117564 A1 8/2002 Hahn et al.

(56) References Cited

U.S. PATENT DOCUMENTS

| | | | | |
|---|---|---|---|---|
| 2016/0045919 | A1 | 2/2016 | McDaniel et al. | |
| 2017/0016188 | A1* | 1/2017 | Langtry .................. | E01F 9/518 |

FOREIGN PATENT DOCUMENTS

| | | | | |
|---|---|---|---|---|
| CN | 105833944 | A | | 8/2016 |
| EP | 0202424 | B1 | | 8/1990 |
| EP | 0525362 | B1 | | 10/1994 |
| JP | 2005270893 | A | * | 10/2005 |
| WO | 1989008752 | A1 | | 9/1989 |
| WO | 1993002797 | A1 | | 2/1993 |
| WO | 1998055234 | A1 | | 12/1998 |
| WO | 2008131477 | A1 | | 11/2008 |

* cited by examiner

PULVERIZER SYSTEM

CROSS-REFERENCE TO RELATED APPLICATIONS

This application is a division of U.S. application Ser. No. 15/405,626 filed Jan. 13, 2017, now issued as U.S. Pat. No. 11,440,021, and issued as U.S. Pat. No. 11,440,021, which, in turn, claims the benefit of U.S. Provisional Application No. 62/279,309 filed Jan. 15, 2016, the disclosures of which are hereby incorporated in their entirety by reference herein.

TECHNICAL FIELD

The present invention relates to a pulverizer also known as a vertical grinding mill which are provided with a rotating shaft with a plurality of arms spinning thereabout which generate a series of air currents inside of a cylinder to pulverize, separate, aerate, and/or homogenize material.

BACKGROUND

Solid materials such as garbage, rubbish or other solid materials have been collected by trucks and transported for disposal for many years.

Burkett developed a centrifugal mill sometime around in the mid-1970s and ended up with U.S. Pat. No. 3,987,970 and others. The applicant's predecessor-in-interest filed Canadian Patent Application Nos. 2,125,797 and 2,147,666 for use with various equipment and methods for pulverizing rock and remediating soil utilizing an improved pulverizer configuration. All three of these patents/applications are incorporated herein by reference in their entirety.

Still others have commercialized an embodiment of the Burkett mill and are trying to sell that design in the marketplace today. However, when attempting to build a Burkett mill with improvements, the applicant discovered there were components of that basic design which could be improved.

SUMMARY

It is the present object of many embodiments of the present invention to provide an improved vertical gyroscopic mill or pulverizer having advanced capabilities.

It is another object of many embodiments of the present invention to provide an improved pulverizer having improved safety features.

It is another object of many embodiments of the present invention to provide an improved pulverizer having improved performance characteristics.

It is another object of many embodiments of the present invention to provide improved efficiency, possibly coupled to increased output and/or reduced down time.

It is another object of many embodiments to provide improved performance for a pulverizer by having adjustable air flow characteristics other than adjustable shaft rotation speed alone.

It is another object of many embodiments of the present invention to provide an improved shaft wrapping removal system.

It is another object of many embodiments of the present invention to provide an improved dust collection system.

Accordingly, in accordance with a presently preferred embodiment of the present invention, a pulverizer or vertical gyroscopic mill can be combined with a conveyor system for (a) feeding the pulverizer and/or (b) likely for removing discharge. The speed of the conveyor(s), particularly the feed conveyor, as well as the speed of the rotation of the pulverizer are preferably controlled by a processor possibly in an interrelated manner. Furthermore, the shaft may be driven by a variable frequency drive motor or other variable speed motor to allow for the processor to control aspects of the speed of the motor. Feedback loops are helpful for some operations of the processor as well, such as to maintain constant power levels and/or feed flows.

A system may control the rate of infeed to at least assist in controlling the process for at least some embodiments.

A system may control the speed of the rotor for some embodiments such as to maintain a specified power level and/or for other objectives.

Additionally, for at least some embodiments, it may be that the speed of the motor and the speed of the conveyor can be linked together so that if the speed of the shaft rotation of the pulverizer is sensed to decrease, then the speed of the conveyor can be correspondingly decreased as well, such as a proportional amount, possibly as compared to overall speeds, amount of decrease or other amounts. Furthermore, if a high resistant object is encountered with an arm and the shaft speed slows down a significant amount, it may be that the processor can direct the ramping back up of the shaft speed after a sudden slow down possibly as well as a corresponding slowing down and then speeding up of the conveyor.

For some embodiments, a vibration sensor can be used to detect when the shaft and/or other components of the pulverizer are vibrating too much to then direct a potential shut down sub-routine to determine the cause of the vibration. The vibration could be caused by unbalanced loading, which could be addressed by first slowing, and then possibly stopping the feed conveyor. The shaft may be slowed slightly, or significantly to see if the vibration clears. Finally, if none of the above slows the vibration issue, the shaft may be stopped.

Additionally, software of at least some embodiments can detect wrapping by sensing an increase in amperage possibly coupled with other effects such as no significant increase or decrease in output or throughput and/or other effects. Once detecting a wrapping step, the processor may stop the shaft. After stopping the feed conveyor, the processor may direct a reverse direction of the shaft for a predetermined speed and/or time (or alternating directions) to allow attempt to dislodge material from wrapped arms. Similarly, if resistance is deemed too low, the processor can speed up certain factors.

Additionally, in an effort to prevent shaft wrapping which can often occur with the top of the pulverizer above the uppermost arm segments, at least one cutting mechanism can be provided in an effort to attempt to cut material which may otherwise wrap towards an upper end of the shaft.

A door opening prevention separator lock for many embodiments can be provided to prevent an access door of the pulverizer from being opened while in operation, or even during spin down after shutting off the pulverizer. Once the shaft is stopped, the interlock may then allow the access door to open.

Additionally, software can be used to maintain the environment of pressure below ambient such as at some vacuum value possibly in combination with a dust depression system at an outlet of the pulverizer possibly with a separator lock option at the outlet so as to prevent, or at least significantly reduce dust in the environment to reduce dust about the pulverizer during operation.

Still these and/or other features may be provided with still other embodiments.

BRIEF DESCRIPTION OF THE DRAWINGS

The particular features and advantages of the invention as well as other objects will become apparent from the following description taken in connection with the accompanying drawings in which.

DETAILED DESCRIPTION

Figure 1:
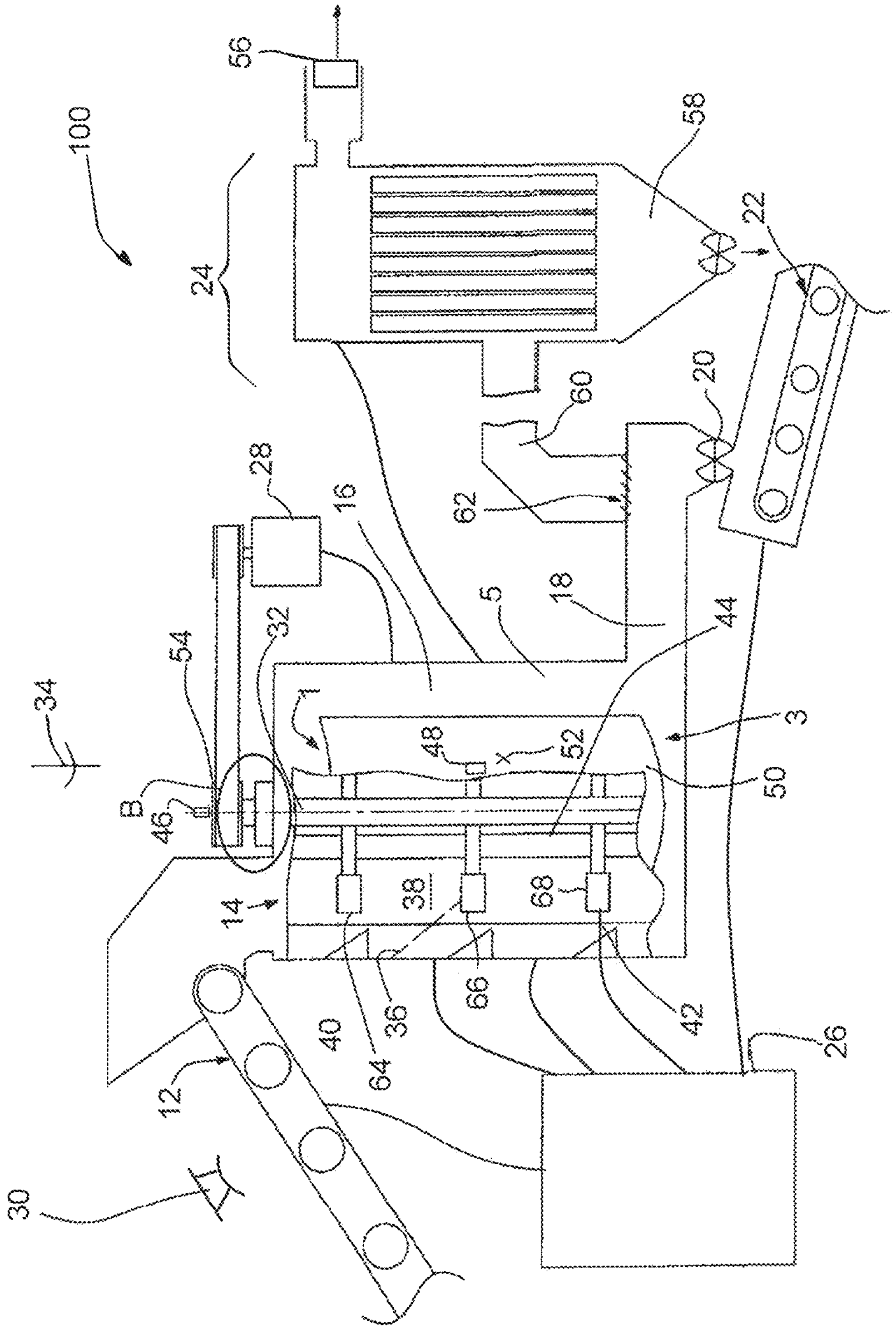
FIG. 1 is a schematic representation of a pulverizer system of a presently preferred embodiment of the present invention.
Figure 2:
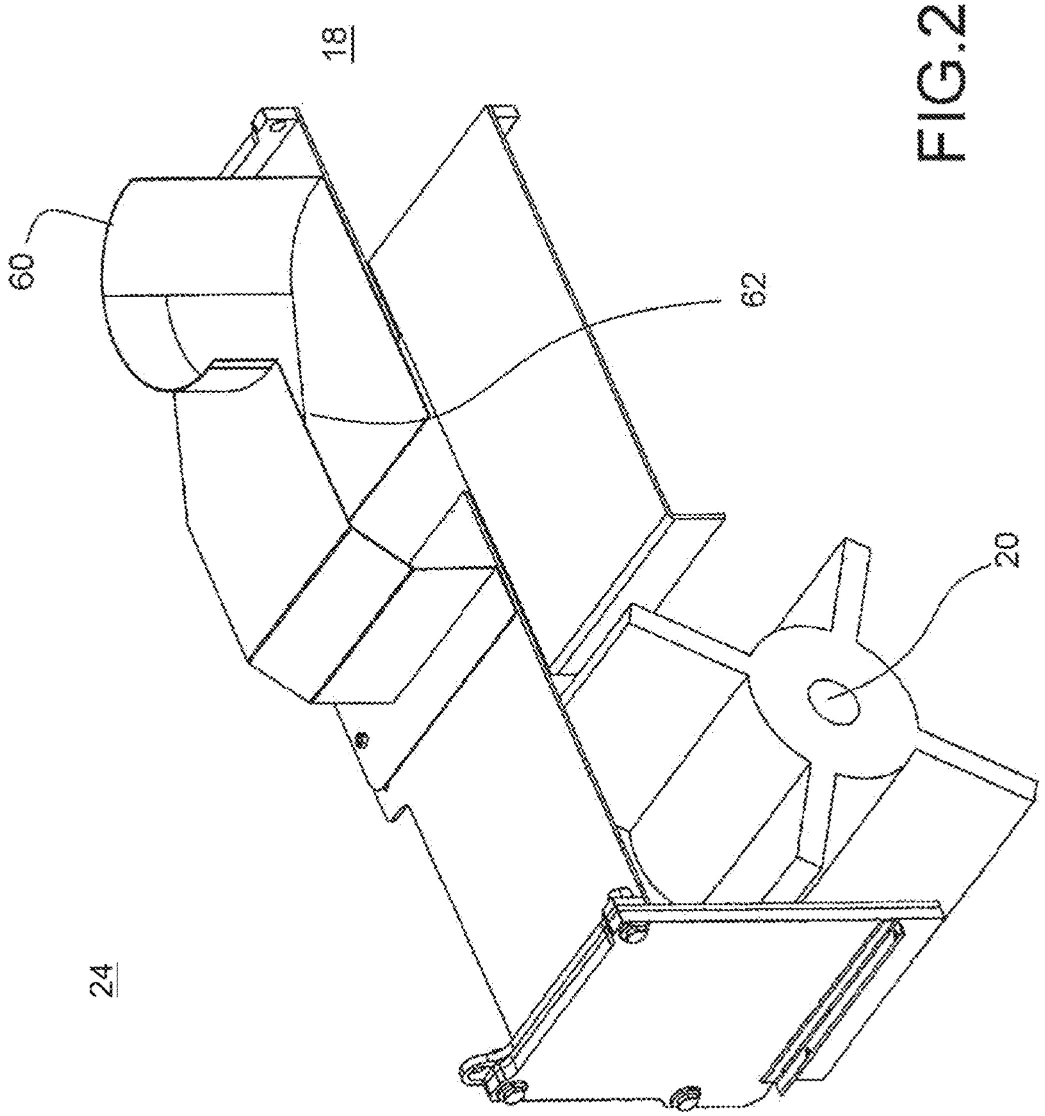
FIG. 2 is a detailed cross sectional view of the dust collection intake shown in FIG. 1.

FIG. 1 shows essentially a schematic representation of the pulverizer system 100 in the form of a feed conveyor 12, feeding to an inlet 14 of a pulverizer 16. Once material is pulverized, it exits out at 18 where optional air lock 20 may assist in discharging ground material onto conveyor 22 or alternatively, it may be that material directed from outlet is deposited directly onto conveyor 22 without optional air lock 20, illustrated.

Figure 4:
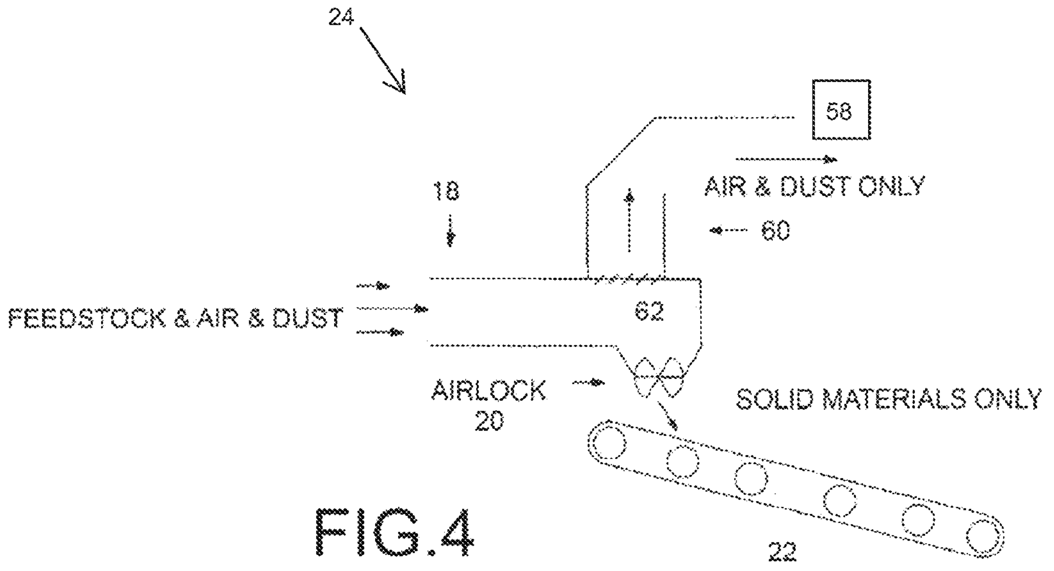
FIG. 4 is a schematic view of a portion of the present invention.
Figure 5:
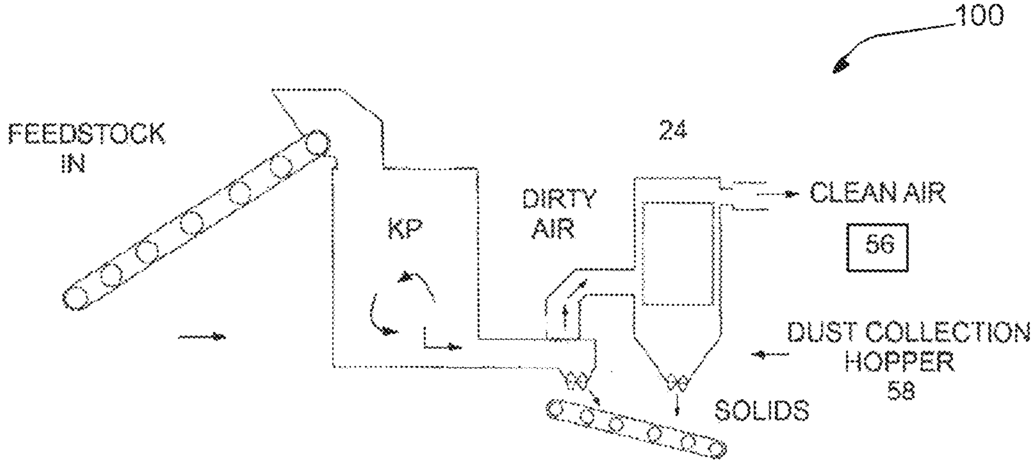
FIG. 5 is a schematic view of a portion of the present invention.

Dust collection system 24 is useful for some, if not many embodiments, to remove dust and will be described in further detail with reference back to FIGS. 1 and 4, possibly under the direction of processor 26. Processor 26 can control many aspects of the system 100 in the pulverizer 16 as will be discussed in further detail below.

The pulverizer 16 is preferably equipped with a variable speed motor 28 such as a variable frequency drive motor which can allow for the processor 26 to assist in controlling the speed of the motor 28. Additionally, the processor 26 may also control the speed of feed of the conveyor 12.

For instance, by having a processor 26 control operation of both the feed (i.e., the amount of fed material) into inlet 14 by controlling the speed of the conveyor 12, possibly in combination with sensors such as sensor 30 directed at conveyor 12 which can sense the input of material into inlet 14. The amount of feed directed into the pulverizer 16 through inlet 14 can be monitored and/or controlled possibly in combination with the speed of rotation of the shaft 32 in an effort to address a variety of different operating conditions.

For instance, during normal operations, if a particular hard grind product is directed into inlet 14, the shaft 32 may reduce rotational speed about rotation axis 34. In order to ramp back up to optimal, it may be that the processor 26 has a ramp up speed routine as provided to the motor 28 so that instead of attempting to instantaneously maintain speed, either a predetermined ramp up routine is selected such as a linear increase or non-linear curve back to speed or possibly having a predetermined intermediate speeds back up to an optimum speed is achieved by the processor 26 running software as provided therewith. Conveyor 12 may follow a similar or dissimilar routine.

Another aspect of the pulverizing system 100 is that the input as provided through inlet 14 can be varied, possibly together with the speed of rotation of the shaft 32 by the motor 28 under certain operating conditions as well. Depending on the particular type of input in inlet 14, a different rate of feed of the conveyor 12 can be selected relative to the speed of the rotation of the shaft 32 about axis 34. Other factors may be addressed with processor 26 to attempt to improve efficiency as well.

Depending on the particular input at issue, it may be that the speed of rotation of the shaft 32 can be selected relative to the speed of the conveyor 12 and/or vice versa and/or the amount of input in inlet 14 possibly in combination with the sensor 30 or other way to measure input into inlet 14. Another feature which can be controlled with the pulverizer 16 is its internal pressure which may be assisted in being controlled by a dust collection system 24 or other system. By directing the pressure inside pulverizer 16 to possibly be below atmospheric pressure such as by using the dust collection system 24, the relative size of particulate leaving the outlet 18 can be reduced. Under certain circumstances, the particulate size as deposited from the outlet conveyor 22 may be more preferably controlled by addressing a pressure in the pulverizer 16, such as with processor 26. Of course, outlet conveyor 22 could have material redirected back into inlet 14 under certain conditions to regrind material and/or could be controlled by processor 26 as well. Dust collection system 24 could be useful to prevent the area around the pulverizer 16 from being a dusty mess. Dust collection system 24 may also collect useful products from the grinding operation.

Also, when the shaft 32 is ramping back up to speed as directed by the processor but the processor 26 may also simultaneously slow down the conveyor 12 and/or maintain a predetermined speed during the ramp up process so as to not overload the input in the inlet 14 of the pulverizer 16.

Also, the processor 26 may perform other functions like direct the flow of input into inlet 14 in order to attempt to maintain a relatively stable power level based on consumption of energy of either the overall system and/or by the motor 28.

For instance, when encountering an increased power consumption by the motor 28, it may be that the input is slowed such as by slowing the conveyor 12 or other step. Furthermore if power consumption is not significant enough as consumed the motor 28, it r ray be that the conveyor 12 can be sped up by the processor 26.

In addition to providing instructions to control both the speed of the motor 28, to thus control the rotational speed of the shaft 32, as well as the speed of the conveyor 12, it may be that there is a feed back loop provided back to the processor 26 for various effects. For instance, it has been discovered that through shelf height optimization, as will be described in further detail below, it may be that a higher throughput (i.e., a higher rate of flow from both into the inlet 14 and outlet 18) can be achieved with a lower power consumption of the motor 28 based on the shelf 36 being provided at a selected height provided through way of adjustment. A 20% higher throughput has been achieved for some feed streams by selecting the specific height of the shelf 36 for some embodiments. By changing the shelf 36 height, the vortices flow in at least the middle section 38 can be varied to effectively change the configuration of those vortices, at least elevationally. Furthermore, it may be that the change in shelf height 36 it may be imparted to the other shelves namely 40 and/or 42 and/or other shelves which could be changed in height as well. Additionally, the relative shape of deflectors or shelves 36,40,42 such as deflector 44 in a similar or dissimilar manner as the shelf 36 is changed in height as will be explained in further detail below.

By providing a feedback route such as with an accelerometer 46 connected to the shaft 32 as well as a variable speed motor 28 such as could be driven by a variable frequency drive system or otherwise, a way of not only providing a desired signal to the motor 28 for a desired speed of the shaft 32 can be provided, but also the speed itself can be sensed with sensor 46 and provided to processor 26.

Other sensors can be utilized with this system which are not presently utilized.

Specifically, a door locking interlock and/or sensor 48 can be provided for use by processor 26 or other device so that access door 50 so that the door 50 may not be opened as illustrated in FIG. 1, unless the shaft 32 is stationary. This feature can prevent the door 50 from being unlocked such as with locking system 52 as might be restrained from opening by lock 48 under certain conditions. Additionally, a vibration sensor 54 may be provided so as to be able to sense vibration of the shaft 32 and/or other portions of the pulverizer 16. A vibration protocol may be employed by the processor 26 so that upon reaching a first predetermined amount of vibration, certain steps are performed such as by first slowing down the motor 28 and/or conveyor 12 to see if the vibration diminishes, and if not, then possibly securing the conveyor 12 and then end the motor 28. A second predetermined amount could result in shutdown of the motor 28 directly.

If the vibration sensor 54 detects the shaft 32 as sensing too much vibration, then it could indicate that a pin is sheared, an arm pad has been damaged, or other complicating factor internal to the pulverizer 16 which could then be somewhat of a self-diagnosing pulverizer 16. If a second predetermined amount of vibration is sensed, it may be that the motor 28 is secured immediately as opposed to going through a slowing step to discourage internal damage in the pulverizer 16.

Of course, the processor 26 could also control the air lock 20, if utilized, as well as the speed of being able to move material onto conveyor 22 and/or the speed of the conveyor 22. Processor 26 may also control the air flow through the dust collection system 24 if utilized and/or could assist in maintaining a desired pressure such as a vacuum or other pressure internal to the pulverizer 16 and/or assist in maximizing efficiency of the fan 56 of the dust collection system 24 for efficiency or other purposes such as removing dust of a given particulate size.

Fan 56 might be a 30 horsepower motor capable of drawing 1000 cubic feet per minute or have other specifications for various other dust collector systems 24. It turns out that for many processes, the dust collected in various bags or dust collection hopper 58 can prove to be quite valuable such as when grounding electronics, it may be that gold dust can be retrieved from the bags or dust collection hopper 58. Other waste may have other valuable components which may be recovered from waste bags or dust collection hopper 58. Plenum 60 could be made of the appropriate gauge of material to be able to withstand the suction forces as provided by fan 56 and it may be that the amount of suction can be varied such as not only with the speed of the fan 56 but also with the size of the opening 62 as will be discussed in further detail with reference to FIG. 4 below either of which could be controlled by processor 26 or otherwise.

The software used by the processor 26 could detect wrapping such as by sensing an increase of amperage without noticing any increase in output 18 and/or input 14 and/or possibly also observing that the amperage is slowly increasing by the motor 28 as it being required by the motor 28. Vibration sensed by the vibration sensor 54 may also contribute to the ability to detect wrapping.

If wrapping is occurring on the aims, such as any of arms 64,66,68, then a routine can be employed to attempt to shed the wrap material from the arms. Specifically, the shaft 32 could be stopped as shown by processor and possibly even the arms 64-68 could then be reversed in direction to attempt to free the arms 64-68 from the wrap material. It may be that a series of spinning in the first direction about the axis and then reversing direction about the axis 34 may be employed in order to attempt to remove such material. Should this step fail to work, then it may be that the door 50 might need to be opened or the shafts 32 stopped to remove any excess wrapped material.

Figure 3:
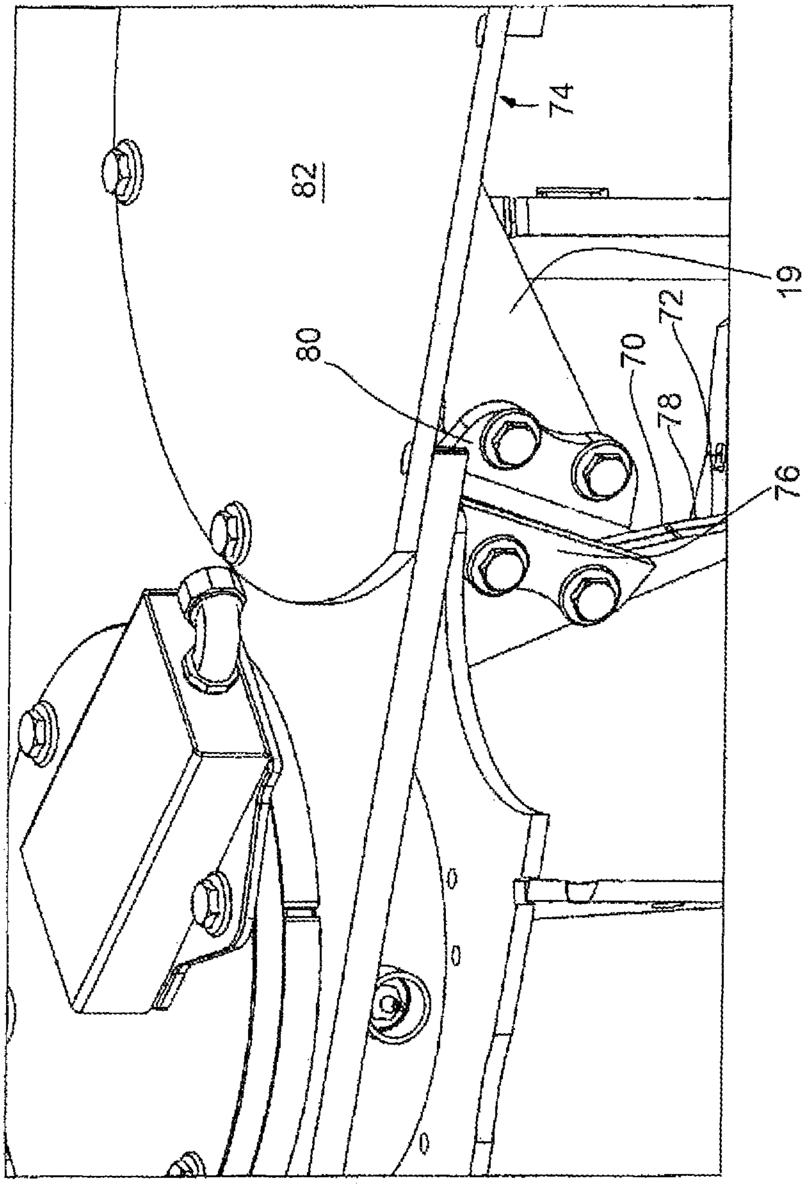
FIG. 3 is an internal view of detail B shown in FIG. 1.

Additionally, if wrapping up on the shaft 32 such as at any of the hubs or even towards the upper portion 74 of pulverizer 16, a shaft wrapping removal system could be employed similar to the one shown in FIG. 3. Specifically, a spacing rib 70 is shown which can assist in pushing material up and away from the shaft 32 or alternatively along a shedding cone 72 or such as one outwardly extending from shaft 32 which might otherwise direct material up towards the spacing rib 70 and/or upper portion 74 of the pulverizer 16. As it travels up the spacing rib 70, it may encounter a first blade 76 which preferably cuts through any material as it passes through or certainly once a predetermined thickness illustrated as thickness 78 is encountered, a second blade or stop 80 can contact the material to either assist in pushing that wrapped material against the first blade 76 and/or cut wrap material with the second blade or stop 80. Accordingly, the most that could be possibly wrapped would likely be of a thickness 78 between the first blade 76 and the second blade or stop 80. Accordingly, as the material attempts to wrap, the material is removed and cut by the blades 76 and/or 80. VHS tapes particularly have a tendency to come unraveled and perform as well as do other certain feed stocks possibly including wires, labels, plastic and/or other materials.

The cone 72 when utilized works as a shedding cone to assist the direction of such materials up into the cutting area of the shaft wrapping removal device illustrated. An access plate 82 may be useful to be able to open the access either the first or second cutting blade 76,80 possibly from outside the pulverizer 16 for adjustment and/or replacement. The cone 72 can be a shedding cone and can further assist in the ability to direct material up to the cutting surfaces of the blade 76 and/or 80. The cone 72 has a larger diameter at a bottom of the cone 72 and increases in diameter before going downwardly.

Accordingly, some embodiments provide a pulverizer 16 comprising a top 1 with an inlet 14, and a conveyor 12 feeding an inlet 14 at the top, a bottom 3, a drum 5 located between the top 1 to the bottom 3, a rotating shaft 32 having radially extending arms 64,66,68 creating flow currents within the pulverizer thereby reducing the size of product input at the inlet 14 and discharged at the bottom 3 at exit 18, and a processor 26 directing the speed of at least one, if not both, of (a) the shaft 32 and (b) the conveyor 12 based at least partially on input of sensors 30 and/or 46, and/or others. A variable speed motor 28, such as a variable frequency drive motor or other motor, directed by the processor 26 may drive the shaft. The processor 26 may be used for other functions such as at least assist in controlling pressure in the drum of the pressurizer 16 such as by controlling a dust collection system 24, possibly having a variable vacuum controlled by the processor 26. Another processor function may be directing the rotation of the shaft 32 in one of a forward and a reverse direction based on detected wrapping of debris about one of the shaft and the arms 64,66,68.

Some embodiments may provide a shaft speed sensor 46 and further comprising a feed back loop communicating shaft speed to the processor 26. These or other embodiments may provide a door interlock 48 whereby the processor 26 prevents opening an access door 50 to the drum when the shaft 32 is rotating. These or other embodiments may provide a vibration sensor such as 46 with the processor 26 directing slowing down the pulverizer 16 if vibration exceeds a first predetermined threshold, and/or stopping the pulverizer 16 if vibration exceeds a second predetermined threshold.

Some embodiments may provide a wrap detection algorithm used by the processor 26 whereby wrapping of material about the arms 64,66,68 is detected by performance of the pulverizer 16. Some algorithms may employ sensing at least one of an increase in amperage required by the motor 28, slowing down of the shaft and increased vibration such as may be sensed by sensor 46 and/or another sensor. If wrapping about the shaft 32 is detected, some embodiments may provide, the pulverizer 16 reverses direction of rotation of the shaft 32, at least briefly in an effort to dislodge wrapped material on the arms 64-68. Spacing ribs 70 and/or a shedding cone 72 located in the drum 5 toward the inlet 16 at the top 1, or upper portion 74 of the pulverizer 16, may be useful to discourage wrapping for many embodiments as well. With the shedding cone 72, for at least some embodiments, at least one blade 76 or 80 near a top of the cone 72 may assist in cutting debris which might otherwise wrap about the shaft 32. Still other embodiments may have some, or all of these features, as well as, or even others.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A pulverizer comprising:
- a drum having a top with an inlet and a bottom with an outlet, the inlet being operatively coupled to a conveyor for feeding the inlet at the top;
- a rotating shaft extending vertically within the drum between the top and the bottom, the rotating shaft having multiple sets of rigid arms extending radially from the rotating shaft in a spaced apart manner, wherein a first set of arms is spaced apart vertically from a second set of arms, to generate flow currents within the pulverizer and reduce a size of a material input at the inlet so as to produce a size reduced material that is discharged at the outlet, the size reduced material comprising dust and a size reduced fraction;
- a dust collection system coupled to the outlet for extracting a fluid mixture of air and the dust from the size reduced fraction, the dust collection system comprising:
  - a material opening configured to discharge the size reduced fraction;
  - a dust opening configured to discharge the fluid mixture; and
  - a fan configured to provide suction at the dust opening to separate the fluid mixture from the size reduced material and discharge the fluid mixture;
- an outlet conveyor operatively coupled to the material opening; and
- a processor programmed to:
  - control a speed of the rotating shaft to thereby increase or decrease the flow currents generated by the multiple sets of rigid arms;
  - control the suction of the fan; and
  - control a speed of the conveyor to control an infeed rate of the material input at the inlet;
- wherein the dust in the fluid mixture has a dust particulate size smaller than a size of the size reduced fraction; and
- wherein:
  - the dust collection system is configured for separating the dust from the air and returning the dust to the outlet conveyor; and
  - the outlet conveyor is configured to redirect at least a portion of the size reduced fraction to the inlet when the at least a portion of the size reduced fraction meets a predetermined condition.

2. The pulverizer of claim 1, wherein the dust collection system includes a variable vacuum controlled by the processor.

3. The pulverizer of claim 1, wherein the processor is further programmed to:
- control an airlock coupled to the material opening.

4. The pulverizer of claim 1, wherein the dust collection system includes one or more bags or one or more hoppers operatively coupled to the dust opening for collecting the dust.

5. The pulverizer of claim 1, wherein the dust collection system is configured for directing the dust towards a dust collection hopper, and the dust collection hopper is configured to return the dust to the outlet conveyor.

6. The pulverizer of claim 1, wherein the dust collection system further comprises at least one of:
- a conduit extending from the outlet, wherein the material opening and the dust opening are in the conduit; and
- a plenum extending from the dust opening and wherein the fan is operatively coupled to the plenum to provide the suction.

7. The pulverizer of claim 1, wherein the processor is further programmed to control the speed of the rotating shaft by controlling a speed of a motor driving the rotating shaft.

8. The pulverizer of claim 1, wherein the processor is further programmed to provide a ramp up routine to increase at least one of:
- a speed of a motor driving the rotating shaft to an optimal speed of the motor;
- the speed of the rotating shaft to an optimal speed of the rotating shaft; or
- the speed of the conveyor to an optimal speed of the conveyor.

9. The pulverizer of claim 8, wherein the ramp up routine comprises at least one of a linear increase, a non-linear curve increase, or predetermined intermediate speeds to reach the optimum speed of the motor, the rotating shaft, and/or the conveyor.

10. The pulverizer of claim 9, wherein the ramp up routine comprises:
- increasing the speed of the rotating shaft to the optimal speed of the rotating shaft while controlling the speed of the conveyor to decrease and/or maintain a predetermined speed.

11. The pulverizer of claim 1, further comprising at least one of:
- a sensor on the inlet and/or conveyor to sense the infeed rate of the material input at the inlet, wherein the processor is programmed to select the speed of the conveyor and/or the speed of the rotating shaft based on information received by the sensor;

one or more shelves coupled to an inner surface of the drum, wherein the processor is programmed to control a height of the one or more shelves in the drum; or an access door providing access to an interior of the drum, wherein the processor is programmed to prevent the access door from opening when the rotating shaft is rotating.

12. The pulverizer of claim 1, wherein the processor is programmed to simultaneously controls the speed of the rotating shaft and the speed of the conveyor based on a power consumption of the pulverizer or a motor driving the rotating shaft.

13. The pulverizer of claim 12, wherein the processor is programed to at least one of:

control the speed of the conveyor to maintain a stable power level based on the power consumption;

decrease the speed of the conveyor in response to an increased power consumption by the motor; or increase the speed of the conveyor in response to a decreased power consumption by the motor.

14. The pulverizer of claim 1, wherein the processor is programmed to;

control the outlet conveyor to cause the at least a portion of the size reduced fraction to be redirected back to the inlet; and/or control a speed of the outlet conveyor.

15. The pulverizer of claim 1, wherein the predetermined condition is based on a relative size of the at least a portion of the size reduced fraction.

16. A pulverizer comprising:

a drum having a top with an inlet and a bottom with an outlet, the inlet being operatively coupled to a conveyor for feeding the inlet at the top;

a rotating shaft extending vertically within the drum between the top and the bottom, the rotating shaft having multiple sets of rigid arms extending radially from the rotating shaft in a spaced apart manner, wherein a first set of arms is spaced apart vertically from a second set of arms, to generate flow currents within the pulverizer and reduce a size of a material input at the inlet so as to produce a size reduced material that is discharged at the outlet, the size reduced material comprising dust and a size reduced fraction;

a dust collection system coupled to the outlet for extracting a fluid mixture of air and the dust from the size reduced fraction, the dust collection system comprising:

a material opening configured to discharge the size reduced fraction;

a dust opening configured to discharge the fluid mixture; and a fan configured to provide suction at the dust opening to separate the fluid mixture from the size reduced material and discharge the fluid mixture;

an outlet conveyor operatively coupled to the material; and a processor for simultaneously controlling a speed of the rotating shaft and a speed of the conveyor based on a power consumption of the pulverizer or a motor driving the rotating shaft, wherein the processor further controls an airflow through the dust collection system; and wherein:

the dust collection system is configured for separating the dust from the air and returning the dust to the outlet conveyor; and the outlet conveyor is configured to redirect at least a portion of the size reduced fraction to the inlet when the at least a portion of the size reduced fraction meets a predetermined condition.

17. The pulverizer of claim 16, wherein the processor is programmed to control the airflow through the dust collection system by at least one of:

control the speed of the rotating shaft to thereby increase or decrease the flow currents generated by the multiple sets of rigid arms;

control the suction of the fan; or control an airlock coupled to the material opening to effect at least one of: maintaining a desired pressure inside the drum, controlling a pressure within the drum, and maximizing efficiency of the fan to selectively remove the dust of a given dust particulate size.

18. The pulverizer of claim 16, wherein the processor is programmed to at least one of:

control the speed of the conveyor to maintain a stable power level based on the power consumption;

decrease the speed of the conveyor in response to an increased power consumption by the motor; or increases the speed of the conveyor in response to a decreased power consumption by the motor.

19. The pulverizer of claim 16, wherein the processor is programmed to select the speed of the conveyor and/or the speed of the rotating shaft based on a type of the material input at the inlet.

20. The pulverizer of claim 16, wherein least one of:

the pulverizer further comprises a sensor on the inlet and/or conveyor to sense the infeed rate of the material input at the inlet, wherein the processor is programmed to select the speed of the conveyor and/or the speed of the rotating shaft based on information received by the sensor;

the pulverizer further comprises one or more shelves coupled to an inner surface of the drum, wherein the processor is programmed to control a height of the one or more shelves in the drum;

the pulverizer further comprises an access door providing access to an interior of the drum, wherein the processor is-is-programmed to prevent the access door from opening when the rotating shaft is rotating; or wherein the processor is programmed to control the outlet conveyor to cause the at least a portion of the size reduced fraction to be redirected back to the inlet; and the predetermined condition is based on a relative size of the at least a portion of the size reduced fraction.

* * * * *